United States Patent [19]

Kirk

[11] Patent Number: 5,423,922
[45] Date of Patent: Jun. 13, 1995

[54] DELACQUERING OF ALUMINUM CANS FOR RECYCLING

[75] Inventor: Thomas E. Kirk, Henrico County, Va.

[73] Assignee: Reynolds Metals Company, Richmond, Va.

[21] Appl. No.: 232,977

[22] Filed: Apr. 25, 1994

[51] Int. Cl.6 .................... C23G 5/032; C23G 1/12; B08B 9/20; C11D 7/26
[52] U.S. Cl. ...................... 134/38; 252/173; 252/174.21; 252/174.22; 252/174.23; 252/DIG. 2; 252/DIG. 8; 252/DIG. 11
[58] Field of Search .................. 134/38; 252/162, 170, 252/172, 173, 174.21, 174.22, 174.23, 174.24, DIG. 1, DIG. 2, DIG. 8, DIG. 11; 209/3, 11, 13, 724, 166, 172, 173

[56] References Cited

U.S. PATENT DOCUMENTS

| | | | |
|---|---|---|---|
| 533,425 | 9/1994 | Aoki et al. | 252/173 X |
| 3,687,858 | 8/1972 | Geisler et al. | 252/170 X |
| 3,748,176 | 7/1973 | Gagliani | 134/38 X |
| 4,365,993 | 12/1982 | Meredith et al. | 134/19 |
| 4,600,513 | 7/1986 | Mizutani et al. | 134/38 X |
| 4,692,263 | 9/1987 | Eberhardt et al. | 252/DIG. 8 |
| 4,728,456 | 3/1988 | Yamasoe et al. | 252/173 X |
| 4,746,422 | 5/1988 | Grimm | 209/172 |
| 4,851,148 | 7/1989 | Yamasoe et al. | 134/41 X |
| 5,096,501 | 3/1992 | Dishart et al. | 252/173 X |
| 5,290,365 | 3/1994 | Whitton | 134/38 |

FOREIGN PATENT DOCUMENTS

| | | |
|---|---|---|
| 4052289 | 6/1992 | Japan. |
| 6057463 | 3/1994 | Japan. |

OTHER PUBLICATIONS

CRC Handbook of Chemistry adn Physics, 63 rd ed., Weast, R. C., ed., CRC Press, Inc., 1982, C-522.

Primary Examiner—Paul Lieberman
Assistant Examiner—Douglas J. McGinty
Attorney, Agent, or Firm—Alan T. McDonald

[57] ABSTRACT

Aluminum can stock is delacquered by treatment with a composition comprising a mixture of a polyalkylene glycol polymer and an aqueous solution of a dicarboxylic acid such as oxalic acid. The cans are cleaned sufficiently for recycling and the solution can be reused to delacquer additional aluminum can stock.

6 Claims, 2 Drawing Sheets

DELACQUERING OF ALUMINUM CANS FOR RECYCLING

FIELD OF THE INVENTION

This invention relates to a composition and method for delacquering aluminum can stock, and more particularly relates to a composition and method for delacquering used aluminum beverage cans (UBCs) for recycling.

BACKGROUND OF THE INVENTION

There is considerable interest in product recycling, and in particular, recycling of beverage cans made of aluminum. However, there are problems in preparing aluminum beverage cans for recycling. In preparation of the original cans for sale, the cans are printed with labeling information to identify the product and producer and impart necessary information to the consumer. Typical printing formulations are often lacquer coatings which adhere to the aluminum can and also for aesthetic purposes. Aluminum cans are overcoated with lacquers to protect the labeling material. Interiors are coated with FDA approved polymetric formulations to maintain product integrity. In order to recycle the can, these coatings must be removed.

There are various procedures proposed by the prior art to delacquer aluminum can stock. Many of these procedures are not environmentally satisfactory and therefore not usable commercially because they produce volatile organic hydrocarbons (VOCs) and/or release hazardous air pollutants (HAPs). Disposal of these solutions can be costly due to their compositions. Accordingly, there is a need in the art to provide compositions and methods for delacquering of aluminum cans which are environmentally friendly.

U.S. Pat. No. 5,246,116 of the present applicant discloses the use of polyalkylene glycol polymer solutions for the separation and recovery of aluminum foils, polymer films and coatings and papers in waste foil-containing laminates, such as packaging waste. The alkylene glycol polymer solution is used in combination with density and flotation separation techniques for complete component separation and recovery.

U.S. Pat. No. 4,692,263 to Eberhardt et al. discloses a stripping paste for removing lacquer from paint coatings which uses a combination of a diethylene glycol monoalkyl ether, a sodium salt of a $C_{14}$-$C_{18}$ fatty acid, water, and optionally, nonionic or anionic wetting agents.

U.S. Pat. No. 4,365,993 to Meredith discloses a process for recovering aluminum from lacquer coated scrap by application of a mixture of halide salts before the lacquer coating is pyrolyzed. This is the type of process which may cause the generation of volatile organic carbons or hazardous air pollutants which the present invention avoids.

U.S. Pat. Nos. 4,600,513 and 4,746,422 disclose processes for detackification and clarification of oversprayed paints and lacquers by use of halogenated hydrocarbons to separate a mixture of plastic particles and contaminants. U.S. Pat. No. 3,748,176 discloses a reclaiming process for aluminum substrates for disks.

The present invention provides a composition and method which overcome problems of the prior art.

SUMMARY OF THE INVENTION

It is accordingly an object of the present invention to provide a novel composition useful for the removal of lacquers from aluminum can stock prior to remelting.

A further object of the invention is to provide a method for the removal of lacquer from aluminum can stock using a novel composition, which methods include procedures for recycling of the composition, and procedures to provide the can stock in a form suitable for recycling.

Other objects and advantages of the present invention will become apparent as the description thereof proceeds.

In satisfaction of the foregoing objects and advantages, the present invention provides a composition for the removal of lacquer from aluminum can stock, which composition comprises a mixture of an effective amount of a polyalkylene glycol polymer and an effective amount of a dicarboxylic acid.

The present invention also provides a method for the removal of lacquer from aluminum can stock which comprises:

a. providing an aqueous solution of a delacquering composition comprising an effective amount of a mixture of a polyalkylene glycol polymer and a dicarboxylic acid, immersing said lacquered aluminum can stock in said solution for a sufficient time to delacquer said aluminum can stock;

b. separating delacquered aluminum can stock from the solution; and c. optionally isolating the lacquer film and pigment particles for disposal by other means/methods.

The present invention also provides procedures for further processing of the delacquered can stock to place it in a form suitable for recycling and a method for recovery of the polyalkylene glycol polymer.

BRIEF DESCRIPTION OF THE DRAWINGS

Reference is now made to the drawings accompanying the application wherein.

DESCRIPTION OF THE INVENTION

Figure 1:
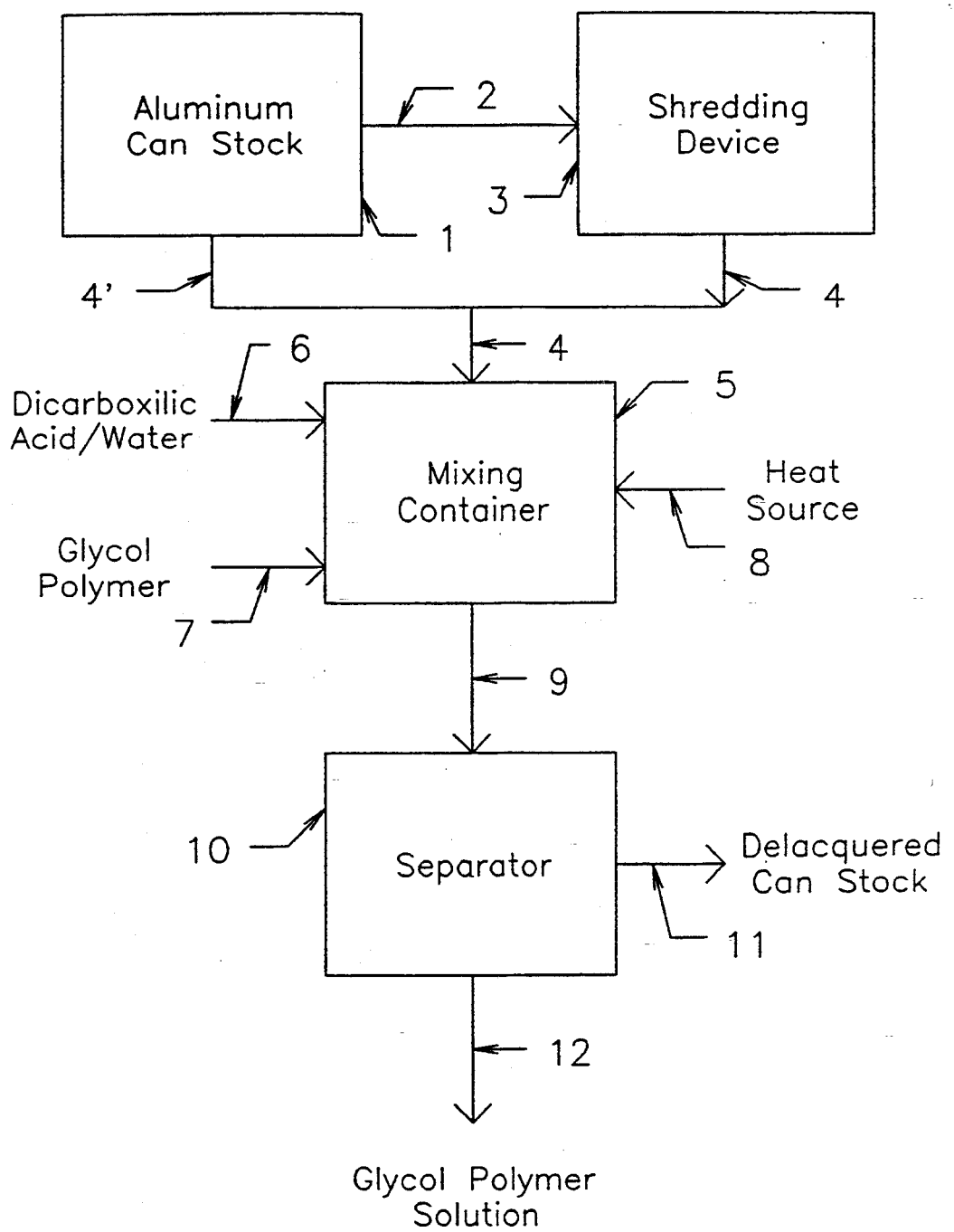
FIG. 1 is a flow diagram illustrating process steps for a first embodiment of the invention.

The present invention provides a composition useful for the removal of lacquer from aluminum can stock in an effective procedure and under environmentally friendly conditions. As indicated above, aluminum beverage cans have applied thereto a lacquer layer for sale of the product to the consumer. Aluminum is a particularly suitable material for recycling after appropriate processing because used aluminum can be recycled by heating above its melting point to form molten aluminum which can then be reformed into aluminum cans or other products in accordance with known procedures. In order to recycle, however, it is critical that all of the labeling material including lacquers and other impurities be removed from the can prior to recycling. It is also critical that the aluminum can be completely clean of all organic contaminants and that all water be removed therefrom because both contaminants and water will adversely affect the molten aluminum and possibly cause violent reactions.

According to the present invention, a novel composition is provided which is effective to delacquer the aluminum cans. This composition is a two-component composition comprising a mixture of a polyalkylene glycol polymer and a dicarboxylic acid, preferably oxalic acid. The glycol polymer is a polyalkylene glycol polymer which includes linear polymers of substantially equal amounts of ethylene oxide and propylene oxide initiated with butanol. The molecular weight is dependent upon the chain length. The preferred molecular weights vary from about 270–1230 with the overall range extending between about 200–10,000. The glycol polymer is water soluble at temperatures below about 40° C. (104° F.). Because of ethoxylation, these polyalkylene glycol polymers exhibit reverse solubility, i.e. at temperatures above 40° C., a solution of the glycol polymer will separate into two layers, the top layer being the polyalkylene glycol polymer or organic layer and the bottom layer being water. This separation characteristic of the glycol polymer fluid is important here in permitting recovery and recycling of the glycol polymer after delacquering of the aluminum cans.

The densities of the preferred glycol polymers range between 0.919–0.983. The densities of the broad range of molecular weights range from 0.919–1.002, the densities being measured at 100° C.

The polyalkylene glycol polymers have the following general formula:

wherein R is selected from the group consisting of hydrogen, a straight chain hydrocarbon having about 2–20 carbon atoms, polyhydroxy substituted hydrocarbons having about 2–10 carbon atoms, aryl hydrocarbon having about 6–20 carbon atoms, and alkyl aryl hydrocarbons having about 7–30 carbon atoms, a may range from 0 to about 75 and b may range between 1 and 100, and b is equal to or greater than a.

The dicarboxylic acid is a lower dicarboxylic acid of the following formula:

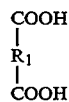

wherein $R_1$ is a covalent bond or an alkylene group of 1–9 carbon atoms. The preferred dicarboxylic acids are water soluble and the most preferred acid is oxalic acid, the lowest member of the series where $R_1$ is a covalent bond. Other suitable dicarboxylic acids are malonic acid, succinic acid, glutaric acid and adipic acid and mixtures thereof.

The delacquering composition is an aqueous solution formed by mixing the polyalkylene glycol polymer and an aqueous solution of the dicarboxylic acid. Preferably the aqueous solution of dicarboxylic acid will contain about 0.5–3 wt. % of the dicarboxylic acid. This aqueous solution is mixed in proportions of about 10–90% to 90–10% by weight of the polyalkylene glycol polymer. The most preferred delacquering dicarboxylic acid is a 1% solution of oxalic acid.

The preferred polyalkylene glycol polymers are available under the tradenames "Carbowax and "UCON-HB", water soluble series from Union Carbide Corporation. The same types of products are available from BASF Wyandotte under the tradenames "PLURONIC" and "TETRONIC".

In the method of the invention, it is theorized that the glycol polymer functions as a type of solvent to delaminate or loosen the physical bond between the can and the lacquer and cause swelling of the lacquer on the can. The dicarboxylic acid is believed to chemically break the bond so that the lacquer can be easily removed from the aluminum can.

In the method of the invention, the delacquering solution is provided preferably in the form of a water bath or the like at about room temperature. The lacquer containing can stock is then added to the water bath. It is preferred that the can stock be shredded into small pieces prior to introduction into the water bath. The water bath containing the delacquering solution is agitated at room temperature, either mechanically or by bubbling air through the bath. This agitation, combined with the delacquering chemical composition, loosens the physical bond between the aluminum surface and the lacquer. The lacquer bond is believed to break because of the attachment to the alkylene glycol polymer or through an adsorption reaction. The lacquer layer then appears to swell at which point the acid, e.g. oxalic acid, breaks the bond with the aluminum surface. The lacquer bonds under these conditions will break in periods of usually less than about one hour.

After the lacquer bonds have been broken, the entire mixture can be filtered or otherwise separated to remove the delacquered aluminum cans or pieces from the aqueous treating solution which now contains the lacquer. The treating solution can be further processed to remove the lacquer and recycling the delacquering composition.

A preferred embodiment of the invention is to provide a complete continuous process whereby the delacquering composition can be recovered and reused and the aluminum can stock cleaned so as to be suitable for direct recycling for melting and reforming into aluminum products such as cans.

In one embodiment, after the lacquer has been loosened from the can, the solution containing the cans or pieces is heated to a temperature in the range of 120°–150° F., (50°–66° C.), which temperature will be effective to cause the glycol polymer to separate, come out of solution, and form a two layered mixture containing the alkylene glycol organic phase as the top layer and a water phase as the bottom layer. The lacquer will generally be concentrated at the interphase between the two layers. At this stage, the organic layer containing the alkylene glycol is separated and filtered to remove the lacquer therefrom.

The aqueous layer containing the carboxylic acid and alkylene glycol polymer layer can be processed by additional treatments for reuse. Losses of alkylene glycol polymer and dicarboxylic acid are not significant in the process. However, before recycling, the concentration of the treating solutions should be checked and fresh alkylene glycol polymer and/or dicarboxylic acid solution added if necessary to restore the original concentrations.

The cleaned aluminum cans or pieces thereof are preferably rinsed using a minimum amount of water and dried. The rinse water can be used in restoring the concentrations of the treating solutions. The can stock is then carefully air dried prior to recycling. It is critical that the drying of the cans be thorough as moisture in molten aluminum reacts violently. Drying of the cans is preferably carried out by hot air in a conventional manner.

Reference is now made to FIG. 1 and a accompanying the application which describe preferred embodiments for conducting the process of the invention.

As may be seen in FIG. 1, aluminum can stock from source 1 is preferably forwarded by line 2 to a shredding device 3 which shreds and sizes the can stock to a preferred size for further processing. The shredding device may be any known type of conventional shredding device suitable for shredding aluminum beverage cans. A preferred size includes squares ranging between 2 and 4 inches on the sides; however, other shapes having equivalent areas can also be utilized. The discharge 4 from the shredding device 3 is charged to passed to mixing container 5. Alternatively, the aluminum can stock could be directly charged into the mixing container as shown by reference numeral 4'. The mixing container 5 includes an agitating device provided with agitator (not shown). The heat source 8 may be any conventional means to heat the mixture contained in the mixing container 5.

The shredded can stock charged into the mixing container 5 is mixed with a solution of a polyalkylene glycol polymer and an aqueous solution of dicarboxylic acid from lines 7 and 6, respectively. As pointed out above, the preferred concentration ranges from about 75 to 90 parts of polyalkylene glycol polymer and about 10 to 25 parts of acid/water. A preferred mixture is about 80 parts of polyalkylene glycol polymer and 20 parts of a 1% solution of dicarboxylic acid, e.g. oxalic acid.

The can stock with the glycol polymer and acid/water solution is agitated at ambient temperature in the mixing container 5 for a sufficient period to delacquer the aluminum can stock. This process generally requires a time period of about 1 to 3 hours to achieve substantially complete delacquering of the can stock.

The resulting mixture is then passed by line 9 to separator 10 where the delacquered can stock is removed at 11. The glycol polymer solution is then recovered at 12 and reprocessed for recycling.

Figure 2:
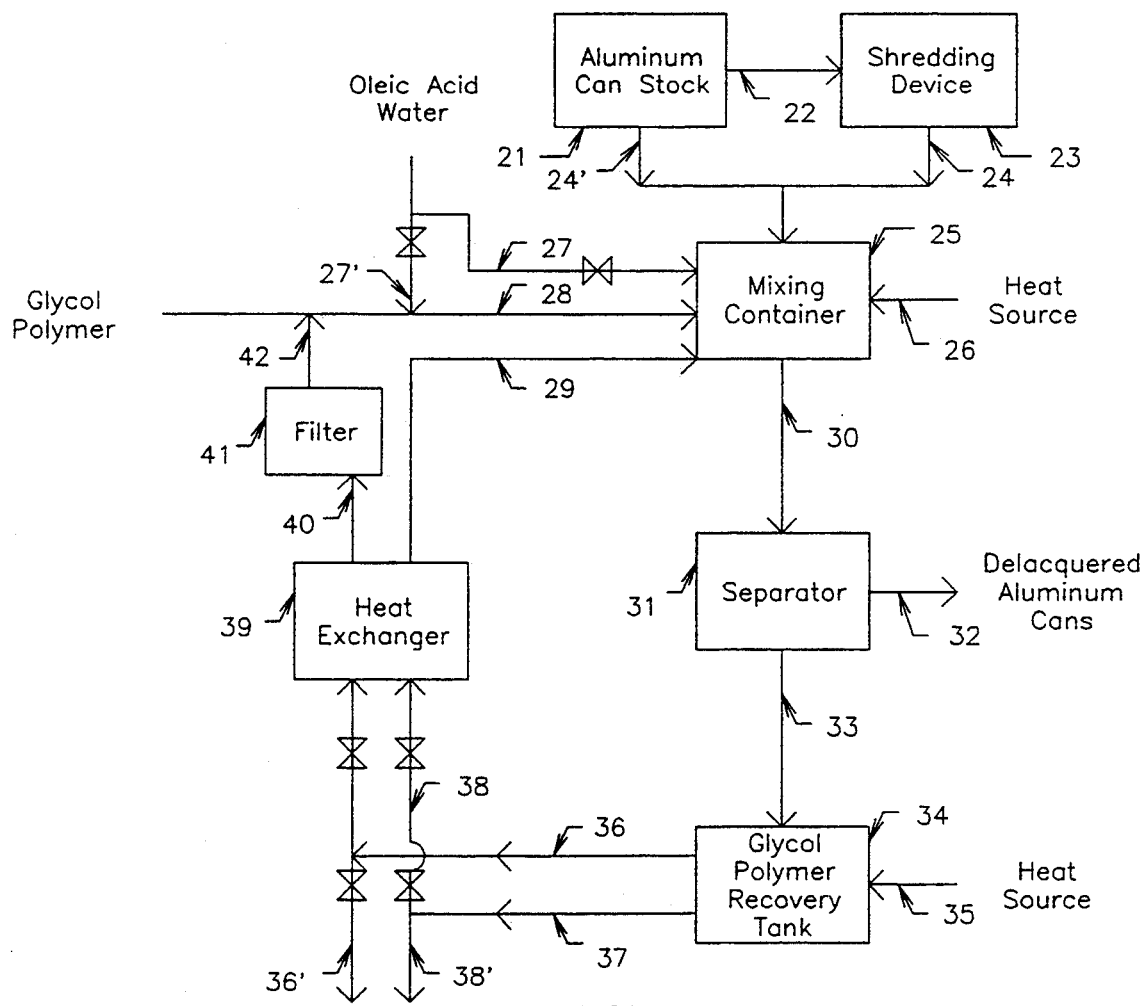
FIG. 2 is a flow diagram illustrating process steps for a second embodiment of the invention.

Reference is now made to FIG. 2 which illustrates a further embodiment of the invention including recycling techniques. As in FIG. 1, beverage can stock from storage 21 is passed by line 22 through shredding device 23 for sizing. The shredded can stock is then passed by line 24 to mixing container 25. Alternatively, beverage can stock could be passed directly by line 24' to mixing container 25. Mixing container 26 is provided with an agitator and stirrer (not shown), and with conventional heat source 26. An aqueous solution of oxalic acid in water is introduced into mixing container 25 through line 31, and glycol polymer is introduced through line 28. Alternatively, the oxalic acid solution could be mixed with the glycol polymer in line 28 via line 27' prior to introduction into mixing tank 25. Recycled water may be introduced through line 29.

In mixing container 25, the beverage can stock is intimately contacted with the glycol polymer water mixture for 1 to 3 hours at ambient temperatures to effect delacquering of the can stock.

After delacquering is completed in the mixing container, the mixture is passed by line 30 to separator 31 from which the delacquered can stock is recovered at 32. The remaining mixture of glycol polymer, oxalic acid, water and lacquer, is then passed by line 33 to glycol polymer recovery tank 34. Glycol polymer recovery tank 34 is provided with heat source 35 to heat the mixture to a temperature in the range of 120° to 150° F., at which temperature the alkylene glycol polymer will separate and come out of solution so as to form a two-layered mixture in the tank. The alkylene glycol organic phase will be the top layer and the water phase will be the bottom layer. The lacquer will be concentrated at the interphase between the two layers. The glycol polymer is removed by line 36 and the water is removed by line 37. The lacquer may then be recovered at 38.

It is a feature of the invention that the glycol polymer and water may be recycled. Thus, the glycol polymer is recycled through line 36 to heat exchanger 39. Some glycol polymer may be disposed of by line 36'. The water is passed by line 37 and may be used as a water recycle 38 to the mixing container through line 29 after heat exchange or may be disposed of at line 38'. If the recovered water from line 37 is recycled, it is first passed through the heat exchanger 39 to cool the water and heat the recycled glycol polymer. The recovered heated glycol polymer at 40 is passed through filter 41 to remove impurities and passed by line 42 to be mixed with fresh glycol polymer at 28 for reintroduction and reuse into the mixing container 25.

It will be seen from this description of FIG. 2 that the recycling process provides a procedure whereby the can stock is recovered in delacquered form, the lacquer is removed from the system and the glycol polymer and water may be recycled for reuse.

The invention has been described herein with reference to certain preferred embodiments. However, as obvious variations thereon will become apparent to those skilled in the art, the invention is not to be considered as limited thereto.

What is claimed is:

1. A continuous method for the removal of lacquer from aluminum can stock which comprises:
   a. providing a water bath containing an aqueous solution comprising a mixture of an effective amount of a polyalkylene glycol polymer and an effective amount of a dicarboxylic acid selected from the group consisting of oxalic acid, malonic acid, succinic acid, glutaric acid, and adipic acid;
   b. immersing said aluminum can stock into said water bath under conditions of agitation;
   c. conducting the agitation for a sufficient time to cause the lacquer to be released from the surfaces of said aluminum can stock and thereby produce delacquered aluminum can stock;
   d. separating the delacquered aluminum can stock from the water bath;
   e. heating the water bath to a temperature of about 120° to 150° F. to form a stratified mixture containing alkylene glycol polymer as the upper layer and aqueous solution as the lower layer;
   f. removing the lacquer interphase between the upper layer and the lower layer; and
   g. purifying the alkylene glycol polymer and aqueous solution and recycling them to the water bath:
   wherein said mixture comprises about 10–90% of said polyalkylene glycol polymer and about 90–10% of said aqueous solution containing about 1.0–3.0% of said dicarboxylic acid.

2. A method according to claim 1, wherein the can stock is shredded prior to introduction into the water bath.

3. A method according to claim 1, wherein the alkylene glycol polymer is heated and filtered prior to recycling to the water bath.

4. A method according to claim 1, wherein said polyalkylene glycol is of the following formula:

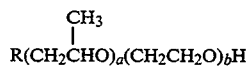

wherein R is selected from the group consisting of hydrogen, a straight chain hydrocarbon having about 2–10 carbon atoms, polyhydroxy substituted hydrocarbons having about 2–10 carbon atoms, aryl hydrocarbons having about 6–20 carbon atoms, and alkyl aryl hydrocarbons having about 7–30 carbon atoms; wherein a ranges from 0 to about 75, b ranges between 1 and 100, and b is equal to or greater than a; and wherein the polyalkylene glycol is water soluble at temperatures below about 40° C. and has a molecular weight of between about 200 and 10,000.

5. A method according to claim 1, wherein the dicarboxylic acid is oxalic acid.

6. A method according to claim 1, wherein said mixture comprises substantially equal amounts of a polyalkylene glycol ether and an aqueous solution containing about 1 wt. % of oxalic acid.

* * * * *